(12) United States Patent
Hiramaki et al.

(10) Patent No.: US 9,389,313 B2
(45) Date of Patent: Jul. 12, 2016

(54) PARKING ASSISTANCE DEVICE

(71) Applicant: AISIN SEIKI KABUSHIKI KAISHA, Kariya-shi, Aichi (JP)

(72) Inventors: Takashi Hiramaki, Nagoya (JP); Jun Adachi, Okazaki (JP); Hiroyuki Tachibana, Okazaki (JP); Tomohisa Yamashita, Toyohashi (JP); Kazuya Watanabe, Anjo (JP)

(73) Assignee: AISIN SEIKI KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/420,788

(22) PCT Filed: Aug. 23, 2013

(86) PCT No.: PCT/JP2013/072574
§ 371 (c)(1),
(2) Date: Feb. 10, 2015

(87) PCT Pub. No.: WO2014/045799
PCT Pub. Date: Mar. 27, 2014

(65) Prior Publication Data
US 2015/0219760 A1 Aug. 6, 2015

(30) Foreign Application Priority Data

Sep. 18, 2012 (JP) .................... 2012-204650

(51) Int. Cl.
*G01S 13/93* (2006.01)
*B62D 15/02* (2006.01)
(Continued)

(52) U.S. Cl.
CPC ............. *G01S 13/931* (2013.01); *B62D 15/027* (2013.01); *B62D 15/028* (2013.01);
(Continued)

(58) Field of Classification Search
CPC ............. B62D 15/0285; B62D 15/028; B62D 15/027; G01S 15/08; G01S 13/931; G01S 2015/934; G01S 2015/935; G01S 15/931; G01S 2013/9314
See application file for complete search history.

(56) References Cited

U.S. PATENT DOCUMENTS

2007/0030347 A1 2/2007 Jecker et al.
2008/0122604 A1 5/2008 Hattori et al.
(Continued)

FOREIGN PATENT DOCUMENTS

DE 102007035219 A1 1/2009
DE 102007061234 A1 6/2009
(Continued)

OTHER PUBLICATIONS

Communication dated Jul. 2, 2015 from the Japanese Patent Office in counterpart application No. 2012-204650.
(Continued)

*Primary Examiner* — Daniel Pihulic
(74) *Attorney, Agent, or Firm* — Sughrue Mion, PLLC (57) ABSTRACT

Provided is a parking assistance device that can obtain information regarding the height from a parking road surface of an object without acquiring height information of an object in advance. The parking assistance device includes: an emission unit configured to emit ultrasonic waves in at least an outward lateral direction of a vehicle; a reception unit configured to receive reflection waves from an object reflecting the emitted ultrasonic waves; and an object determination unit configured to receive the reflection waves from an object existing on a far side of a target parking region as the vehicle enters the target parking region, and determine a feature relating to the height of the object based on a change in a detection state of the object, which was specified based on the obtained reflection wave data.

11 Claims, 6 Drawing Sheets

(51) Int. Cl.
*G01S 7/539* (2006.01)
*G01S 15/08* (2006.01)
*G01S 15/93* (2006.01)

(52) U.S. Cl.
CPC ............ *B62D15/0285* (2013.01); *G01S 7/539* (2013.01); *G01S 15/08* (2013.01); *G01S 15/931* (2013.01); *G01S 2013/9314* (2013.01); *G01S 2015/934* (2013.01); *G01S 2015/935* (2013.01)

(56) References Cited

U.S. PATENT DOCUMENTS

| | | | |
|---|---|---|---|
| 2009/0095084 A1* | 4/2009 | Barth | G01S 15/931 73/597 |
| 2009/0128364 A1* | 5/2009 | Lee | B60Q 9/004 340/932.2 |
| 2011/0013201 A1 | 1/2011 | Scherl et al. | |
| 2011/0121994 A1 | 5/2011 | Pampus et al. | |
| 2015/0219760 A1* | 8/2015 | Hiramaki | B62D 15/0285 367/99 |

FOREIGN PATENT DOCUMENTS

| | | |
|---|---|---|
| DE | 102008004632 A1 | 7/2009 |
| EP | 1764630 A1 | 3/2007 |
| EP | 2073038 A2 | 6/2009 |
| JP | 2002-120677 A | 4/2002 |
| JP | 2002-154396 A | 5/2002 |
| JP | 2007-505298 A | 3/2007 |
| JP | 2008-132938 A | 6/2008 |
| JP | 2009-500225 A | 1/2009 |
| JP | 2009-502636 A | 1/2009 |

OTHER PUBLICATIONS

International Search Report for PCT/JP2013/072574 dated Nov. 26, 2013.
Translation of International Preliminary Report on Patentability/Written Opinion, dated Apr. 2, 2015 from the International Searching Authority in counterpart Application No. PCT/JP2013/072574.
Communication dated Nov. 9, 2015 from the European Patent Office in counterpart application No. 13838216.3.

* cited by examiner

PARKING ASSISTANCE DEVICE

CROSS REFERENCE TO RELATED APPLICATIONS

This application is a National Stage of International Application No. PCT/JP2013/072574 filed Aug. 23, 2013, claiming priority based on Japanese Patent Application No. 2012-20465 filed Sep. 18, 2012, the contents of all of which are incorporated herein by reference in their entirety.

TECHNICAL FIELD

The present invention relates to a parking assistance device including an emission unit that emits ultrasonic waves in at least an outward lateral direction of a vehicle, and a reception unit that receives reflection waves from an object reflecting the ultrasound waves.

BACKGROUND ART

If an object such as a high wall or a handrail is installed along the far side of a target parking region (the side opposite to the side through which the vehicle enters the target parking region), that object will hinder parking.

For this reason, there are conventional parking assistance devices that determine whether or not an impeding object is installed along the far side of a target parking region, as in Patent Document 1.

With this parking assistance device, when the vehicle is caused to travel forward along the installation position of the target parking region at a time before the vehicle is to enter the target parking region, ultrasonic waves are emitted at a predetermined interval to the far side of the target parking region, and the distance to an object is measured.

As a result, reflection waves with a low projection height from the parking road surface, such as those reflected by a curbstone or the like, and reflection waves reflected by a wall or the like with a high projection height from the parking road surface are measured so as to determine whether or not a barrier exists.

Accordingly, the distance of an object at a low position, such as a curbstone, and the distance to an object at a high position, such as a wall, are compared, and if the difference between the respective distances to the objects is greater than or equal to a predetermined value, it is assumed that the object at the high position is at a position that is sufficiently further than the object at the low position, and it is not determined as a barrier for parking. On the other hand, if the difference in the distances to the objects is smaller than a predetermined value, it is assumed that a wall, a handrail, or the like exists near the curbstone or the like, and it is determined that an impeding object exists along the target parking region.

PRIOR ART DOCUMENT

Patent Document

Patent Document 1: JP 2009-502636A

SUMMARY

Problem to be Solved by Invention

With the conventional parking assistance device, in the case where two objects at different distances are detected, it is assumed that the nearer object is the object with a low projection height from the parking road surface, such as a curbstone or the like. In other words, the nearer object is not treated as an impeding object. Furthermore, it is determined whether or not the further object is an impeding object.

Also, with the conventional device, the ultrasonic waves are emitted in the step of traveling forward, which is before the vehicle is caused to enter the target parking region. Accordingly, the distance from the vehicle to the object that exists on the far side of the target parking region increases in length, attenuation of the reflected waves from the object increases, and there is a limit to raising the accuracy of detecting the object.

The present invention has been made in view of the foregoing circumstances, and it is an object thereof to provide a parking assistance device that can obtain information regarding the height from the parking road surface of the object without obtaining height information of the object in advance.

Solution

A parking assistance device according to the present invention includes an emission unit configured to emit ultrasonic waves in at least an outward lateral direction of a vehicle; a reception unit configured to receive reflection waves from an object reflecting the emitted ultrasonic waves; and an object determination unit configured to, based on a change in a detection state of an object that exists on a far side of a target parking region in which the vehicle is to be parked, the detection state having been specified based on reflection wave data obtained using the reflection waves from the object, determine a feature relating to the height of the object as the vehicle enters the target parking region.

With this kind of parking assistance device, the emission unit is normally provided in the vehicle at a predetermined height from the road surface. For this reason, an object such as a curbstone, which has a low projection height from the parking road surface (road surface of region in which the vehicle is to be parked) and has a low risk of hindering the opening and closing of doors and the like when parking the vehicle, tends to fall out of the emission range of the ultrasonic waves in the process of causing the vehicle to enter the target parking region. Accordingly, the reception state of reflection waves from the object that exists at such a low position changes as the vehicle enters the target parking region.

On the other hand, an object such as a wall, which has a high projection height from the parking road surface and has a risk of being an obstruction when parking, is not likely to fall out of the emission range of the ultrasonic waves in the process of causing the vehicle to enter the target parking region. Accordingly, the reception state of the reflection waves from the object that exists at such a high position does not change much as the vehicle enters the target parking region.

A parking assistance device having this configuration acquires the detection state of the object based on the reflection wave data obtained using the reflection waves from the object that exists on the far side of the target parking region as the vehicle enters the target parking region, and based on a change in the detection state, determines the feature relating to the height of the object.

By being aware of how the detection state of the object changes when the vehicle enters the target parking region, the parking assistance device having this configuration can obtain height information of the object with the use of only one ultrasonic wave sensor.

In the parking assistance device according to the present invention, the object determination unit can be configured to include a storage unit configured to store the reflection wave data each time the vehicle moves a predetermined distance.

A regular ultrasonic wave sensor emits ultrasonic waves at a predetermined interval. However, during parking assistance, it is not necessary to specify the precise shape without need when an object that exists on a side of the target parking region is detected. Also, since the present invention needs to specify the detection state of the object while the vehicle is traveling, it is necessary to improve the calculation load or the calculation speed.

For this reason, in the present invention, a configuration is used in which the reflection wave data received by the reception unit is stored in the storage unit each time the vehicle moves a predetermined distance. In other words, regardless of the speed of the vehicle and the like, the reflection wave data is stored according to the travel distance of the vehicle. For this reason, even if the driver of the vehicle changes the travel speed, for example, the amount of storage data does not change for each respective segment, and the calculation load does not increase. With this configuration, since the detection state of the object can be specified using the minimum necessary amount of reflection wave data, it is possible to obtain an efficient parking assistance device.

With the parking assistance device according to the present invention, a detection frequency at a time when the reflection wave data stored in the storage unit is mapped in a two-dimensional map and the reflection wave data has been grouped based on a distribution state of the mapped reflection wave data, the detection frequency being calculated based on the grouped reflection wave data, can be used as the detection state of the object.

According to the present configuration, by mapping the reflection wave data, it is possible to know the general shape of the detected object. For example, it is possible to distinguish whether the shape is elongated, as with a wall, a curbstone, or the like that is an impeding object during parking, is aggregated, or the like.

On the other hand, even if the object is elongated, the dimension of the height is unclear from only the shape. In view of this, with the present configuration, the reflection wave data is grouped based on the distribution state, for example, of the reflection wave data. As described above, since the ultrasonic waves are always emitted to and reflected by a tall object such as a wall, the detection frequency of the reflection wave data is high. On the other hand, since short objects such as a curbstone are not favorably struck by the ultrasonic waves depending on the case, the detection frequency of the reflection wave data is low.

In this way, by focusing on the detection frequency calculated based on the reflection wave data, it is possible to distinguish between states of reflection waves being reflected from the object. The detection states for each object as viewed from the reflection wave data can be understood in advance. Accordingly, with the present configuration, it is possible to not only understand the shape of the object, but also to easily know the height dimension of the object as well.

With the parking assistance device according to the present invention, when the shape of the grouped region is an elongated shape along the installation position of the target parking region and a plurality of the grouped regions are aligned along the installation position of the target parking region, the object determination unit can determine that an object, in a region, whose detection frequency changes from high to low is a curbstone.

As described above, a curbstone, which has a low height, has a tendency to fall out of the emission range of the ultrasonic waves when the vehicle emitting the ultrasonic waves approaches. Accordingly, if the shape of the grouped region is an elongated shape and the detection frequency of the reflection wave data included therein changes from high to low, the object can be determined as being a curbstone, which is low in height.

With the parking assistance device according to the present invention, when the shape of the grouped region is an elongated shape along the installation position of the target parking region and a plurality of the grouped regions are aligned along the installation position of the target parking region, if the detection frequency of a region does not change, or changes from low to high, the object determination unit can determine that the object is a wall.

With respect to an object that is tall, such as a wall, unless the distance from the vehicle to the object is too far, the object is reliably struck by the ultrasonic waves. Accordingly, in this case, if the shape of the grouped regions is elongated and the detection frequency of the reflection wave data included therein does not change, or changes from low to high, the object can be determined as being a wall, which is tall. Incidentally, examples of cases in which the detection frequency of the reflection wave data changes from low to high include a case in which the variance of the reflection waves decreases and the reception accuracy increases as a result of gradually approaching a wall as the vehicle travels, and the like.

With the parking assistance device according to the present invention, the detection state can be a calculation value obtained by subjecting the grouped region to linear approximation along the installation position of the target parking region and dividing the amount of reflection wave data included in the region by the length of the line obtained by approximation.

In the present invention, the object to be detected is limited to an elongated object such as a wall or a curbstone. In this case, if the mapped reflection wave data is restricted such that it is approximated linearly, the calculation load in data processing will be smaller. Note that in the present invention, information regarding the dimensions of the objects needs to be acquired. In view of this, in one group, the length of the approximated line is obtained, and the amount of reflection wave data included in the group is divided by the length of the line, and thus the calculated value is obtained. The numerical value is the amount of reflected wave data per unit length of the approximated line. By obtaining the calculation values for each specific object and handling them in advance as the detection states of the objects, it is easy to specify and determine the object thereafter.

Also, with the present configuration, by subjecting the reflection wave data to linear approximation, it is easier to schematize the shape of the object and display it on a monitor or the like. As a result, it is easier for the driver of the vehicle to understand that an object exists in the periphery of the vehicle.

With the parking assistance device according to the present invention, when approximated lines are aligned along the installation position of the target parking region, if the calculation value for an approximated line changes from a high value to a low value, the object determination unit can determine that the object is a curbstone.

The height dimension feature of the calculated value of the approximated line is the same as the feature of the detection frequency in the grouped regions of the reflection wave data. Accordingly, with the present configuration, if the calculation value changes from a high value to a low value, the object can be determined as being a curbstone. In the case where a difference between calculation values is provided for the approximated line, it is possible to distinguish between them using various methods, such as displaying it using a solid line on a monitor if the calculated value is high and displaying it using a dotted line if the calculation value is low.

With the parking assistance device according to the present invention, when approximated lines are aligned along the installation position of the target parking region, if the calculation value for an approximated line does not change, or changes from a low value to a high value, the object determination unit can determine that the object is a wall.

Thus, if the calculation value does not change or if it changes from a low value to a high value, it is possible to determine that the object is a wall.

With the parking assistance device according to the present invention, the object determination unit can include a detection range setting unit configured to, when the reflection waves from the object are received, set a specification range with respect to the target parking region, and use the reflection waves from the object that exists in the specified range as an evaluation target.

With the present configuration, by using only the reflection waves from the object that exists in the specified range as the evaluation target for the target parking region, it is possible to exclude the reflection wave data reflected in corner portions of a neighboring parked vehicle, for example. Accordingly, a parking assistance device can be obtained in which errors in object shape recognition caused by unnecessary reflection wave data are less likely to occur and the load of calculation processing is decreased.

With the parking assistance device according to the present invention, the object determination unit can be configured to perform determination based on, among the reflection waves, the reflection waves from an object that is the closest to the reception unit.

With the present configuration, when reflection wave data is acquired, by using not all of the reflection waves from the object, but only the reflection waves from the object closest to the reception unit as the evaluation target, it is possible to reduce the load of the determination processing in the object determination unit.

EMBODIMENTS

Embodiments of the present invention will be described below with reference to the drawings.

Figure 1:
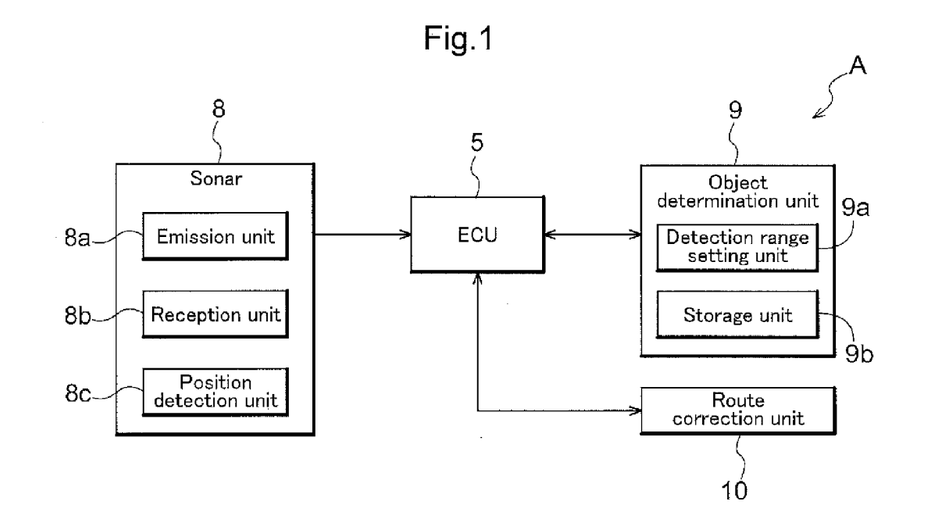
FIG. 1 is a block diagram showing a parking assistance device.

FIG. 1 is a configuration diagram of a parking assistance device according to the present embodiment.

Figure 2:
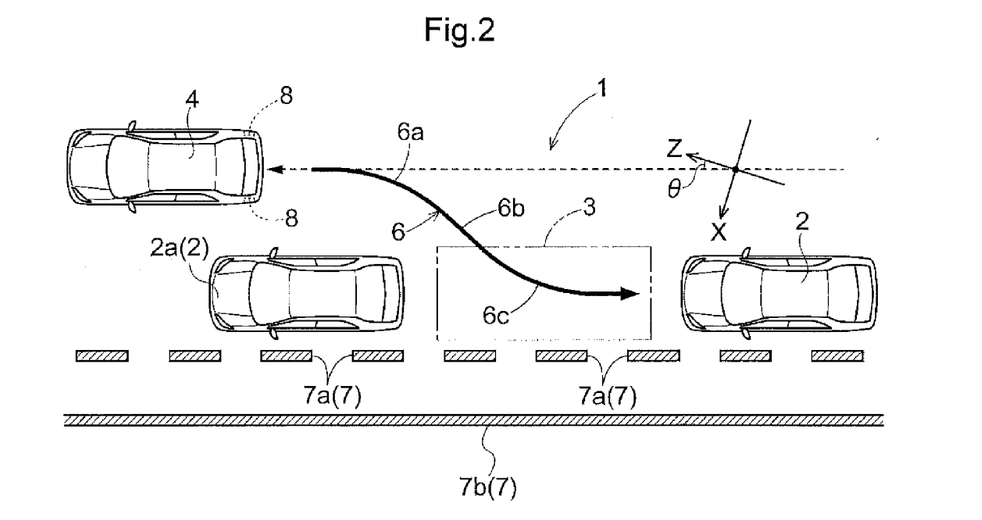
FIG. 2 is a plan view for describing a target parking region.

A parking assistance device A includes an electronic control unit 5 (hereinafter simply referred to as "ECU 5") that causes a vehicle 4 to be parallel parked in a target parking region 3 that is set between parked vehicles 2 along the side of a vehicle path 1, as shown in FIG. 2, for example.

As shown in FIG. 2, the ECU 5 sets the target parking region 3 and a parking movement route 6 from the vehicle path 1 to the target parking region 3, and causes the vehicle 4 to move backward by executing vehicle assistance control by means of automatic steering.

A sonar 8 that detects the position of the parked vehicles 2, and a curbstone 7a, a wall 7b, or the like serving as an object 7 that is set along the far side of the target parking region 3, an object determination unit 9 that determines a feature relating to the projection height from a parking road surface 1a of the object 7 that is set along the far side of the target parking region 3, and a route correction unit 10 that corrects the parking movement route 6 based on the result of determination performed by the object determination unit 9 are connected to the ECU 5.

As shown in FIG. 2, the sonars 8 are mounted on both the right and left sides near the rear wheels of the vehicle 4 and emit ultrasonic waves therefrom in a left-right symmetrical direction, or in one of the left and right directions depending on the parking mode. As shown in FIG. 1, the sonar 8 includes an emission unit 8a that emits ultrasonic waves at a predetermined interval on the order of several milliseconds, for example, a reception unit 8b that receives the reflection waves from the parked vehicles 2 or the object 7, corresponding to the ultrasonic waves, and a position detection unit 8c that detects the position at which the object 7 exists based on the amount of time for the ultrasonic waves to make a round trip.

Figure 3:
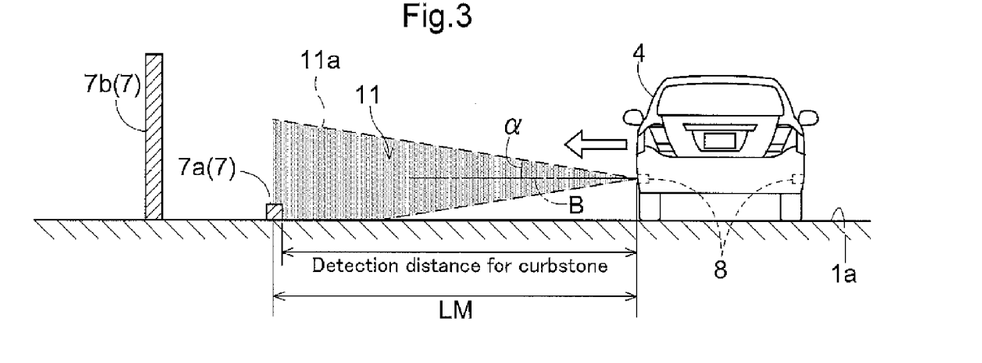
FIG. 3 is a diagram showing a detection operation performed by a sonar in a case where a curbstone and a wall are installed in alignment.
Figure 4:
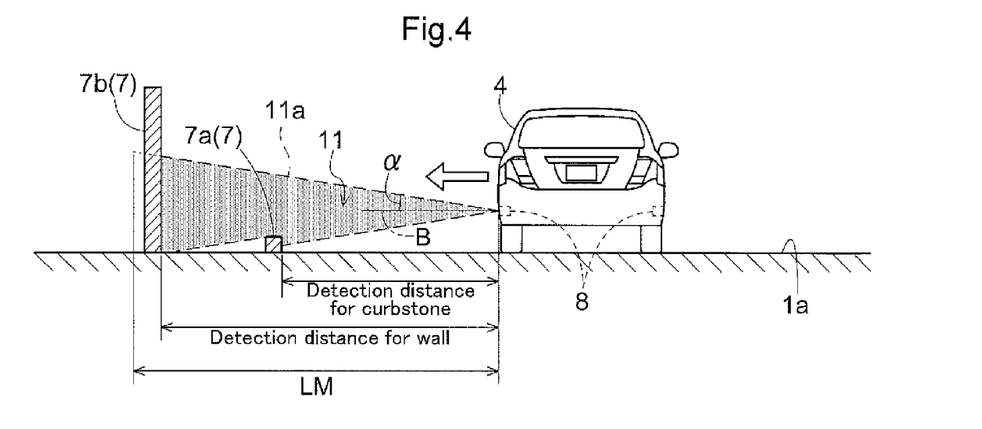
FIG. 4 is a diagram showing a detection operation performed by a sonar in a case where a curbstone and a wall are installed in alignment.
Figure 5:
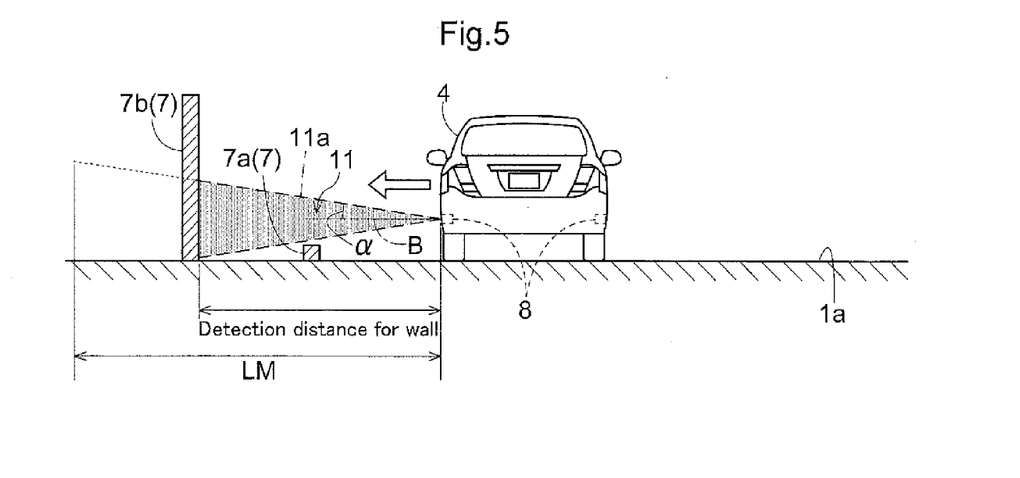
FIG. 5 is a diagram showing a detection operation performed by a sonar in a case where a curbstone and a wall are installed in alignment.

As shown in FIGS. 3 to 5, the emission unit 8a emits ultrasonic waves in the direction of the roughly horizontal reference axis B that is orthogonal to the vehicle front-rear direction. Note that since the ultrasonic waves are emitted in the interior of a conic surface 11a having an angle α with respect to the reference axis B, the emission range 11 of the ultrasonic waves spreads the further it is from the vehicle 4, and the ultrasonic waves are attenuated more the further away they are.

A maximum detection distance LM at which an object can be appropriately detected is set along the reference axis B in the sonar 8. An object further than the maximum detection distance LM cannot necessarily be measured accurately since the ultrasonic waves are attenuated excessively. In the present embodiment, the maximum detection distance LM is set at a distance that is roughly the same as or twice the lateral width of the vehicle 4, for example.

Based on the reflection waves from the object 7 received by the sonar 8, the curbstone 7a or the wall 7b that exists along the target parking region 3 is detected while the shape thereof is specified in the present embodiment.

In the present embodiment, the sonars 8, which are provided on the left and right of the vehicle 4, are used to determine whether the detected object 7 is the curbstone 7a or the wall 7b, for example, while the vehicle 4 is proceeding toward the target parking region 3. For this purpose, the following properties of the sonars 8 are used.

FIGS. 3 to 5 show examples in which ultrasonic waves are emitted to the curbstone 7a, which has a low projection height from the parking road surface 1a, and to the wall 7b, which has a high projection height. The height of the curbstone 7a is normally around 20 cm. Accordingly, if the tire does not come into contact with the curbstone 7a, the door of the vehicle 4 will not come into contact with the curbstone 7a when opening and closing, and the curbstone 7a is not an impedance during parking of the vehicle 4 in many cases.

As shown in FIG. 3, the sonar 8 is provided at a position at a predetermined height of the vehicle 4. Accordingly, as shown in FIGS. 3 and 4, if the position of the vehicle 4 is separated from the curbstone 7a by a certain distance, the curbstone 7a can be detected as an object.

On the other hand, as shown in FIG. 5, if the vehicle 4 approaches the curbstone 7a and the curbstone 7a falls out of the emission range 11 of the ultrasonic waves, the curbstone 7a can no longer be detected.

Accordingly, the mode of detecting the curbstone 7a is such that the curbstone 7a can be detected clearly at first but becomes difficult to detect as the vehicle 4 approaches, and eventually can no longer be detected.

Note that since the height at which the sonar 8 is mounted on the vehicle 4 and the emission range 11 of the sonar 8 are known, the height of the object 7 can be obtained by measuring the distance at which the object 7 becomes undetectable.

Also, FIGS. 3 to 5 also show examples in which the ultrasonic waves are emitted to the wall 7b, which has a high projection height from the parking road surface 1a. In this case, as shown in FIGS. 4 and 5, the ultrasonic waves are reliably emitted to the wall 7b, regardless of the distance between the vehicle 4 and the wall 7b. However, as shown in FIG. 3, if the distance between the vehicle 4 and the wall 7b is greater than or equal to a maximum detection distance LM, the wall 7b cannot be detected.

On the other hand, if the distance between the vehicle 4 and the wall 7b is shorter, the wall 7b can be detected in many cases. The sonar 8 has a minimum detection distance. If the vehicle comes any closer to an object than the minimum detection distance, the object cannot be detected, but the minimum detection distance is normally several tens of cm short. Accordingly, in the present embodiment, in which the distance between the wall 7b and the vehicle 4 is set so that the door can be opened and closed, the minimum detection distance can be ignored.

Based on the above description, the mode of detecting the wall 7b is such that the wall 7b is originally separated by at least the maximum detection distance LM and therefore the wall 7b cannot be detected, but if the vehicle 4 is brought closer than the maximum detection distance LM to the wall 7b, the wall 7b can be detected clearly.

By thus using the properties of reflection wave data obtained from obstructions with different heights, impeding object determination is performed as follows in the present embodiment.

Note that "reflection wave data" in this context refers to data regarding the distance from the vehicle 4 (sonar 8) to the impeding object, the distance being calculated based on the reflection waves from the impeding object.

Figure 6:
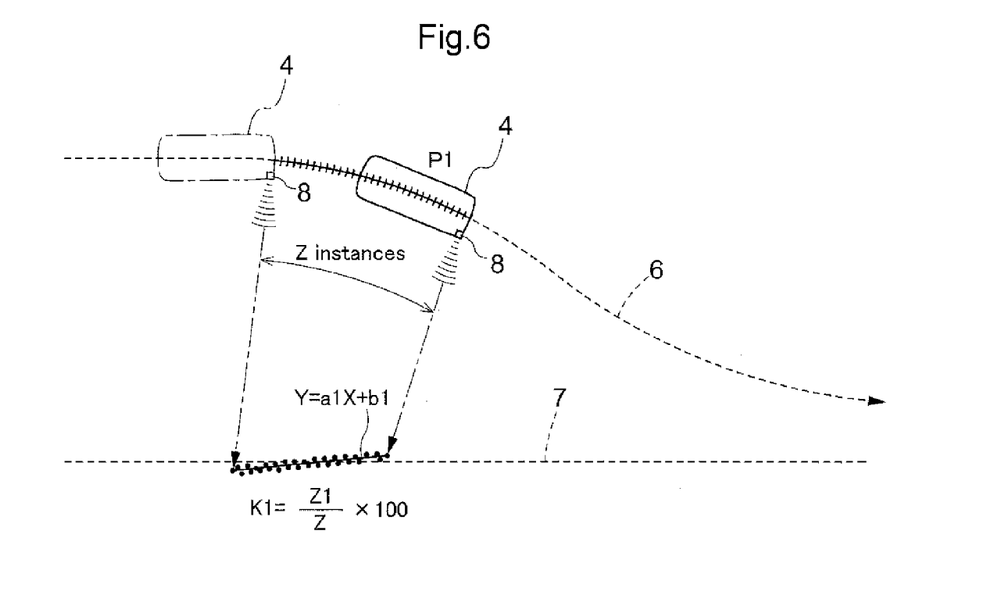
FIG. 6 is a diagram showing an example of a two-dimensional map created based on reflection wave data.
Figure 7:
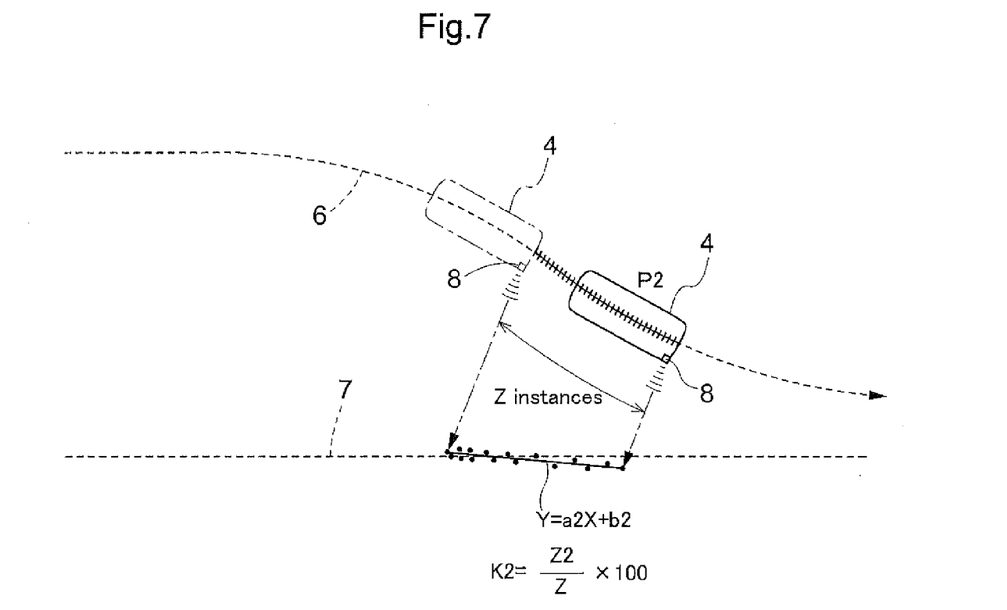
FIG. 7 is a diagram showing an example of a two-dimensional map created based on reflection wave data.

FIGS. 6 and 7 show a two-dimensional map obtained by plotting where the objects 7 exist on the road surface, based on the reflection wave data.

In these figures, an object 7, such as the curbstone 7a or the wall 7b is installed in the lateral direction, and these figures show the position of the object 7 obtained in the case where the vehicle 4 approaches the object 7 in an S-shaped curve. While the vehicle 4 backs toward the object 7, the sonar 8 emits the ultrasonic waves from the emission unit 8a at a constant time interval. The constant time interval is set in advance according to the standard of the sonar 8 that is to be used, and the like. In general, each time the sonar 8 emits ultrasonic waves, the reception unit 8b receives the reflection waves, and the position detection unit 8c calculates the position of the object. Since the sonar 8 emits the ultrasonic waves at a constant time interval and receives the reflection waves, it is also possible to accumulate all of the transmission/reception data. However, it is not preferable since the amount of data accumulated per unit travel distance will vary and the detection reference will be different if the travel speed of the vehicle 4 changes. Also, it is not necessary to calculate and store an excessive amount of data.

In view of this, in the present embodiment, not all of the reflection wave data obtained by the reception unit 8b is used. Rather, only the reflection wave data obtained each time the vehicle 4 travels a predetermined distance is stored in the storage unit 9b of the object determination unit 9. Accordingly, it is sufficient that the minimum necessary amount of data processing is performed for detecting the impeding object, and thus the processing efficiency improves and the determination reference is stabilized.

Specifically, first, the data regarding the distance to the object 7, which has been obtained from the reflection waves from the object 7 (reflection wave data), is stored in the storage unit 9b. Furthermore, by calculating the detection position of the object 7 on the plane of the road surface based on the reflection wave data, a two-dimensional map is created as shown in FIG. 6. At this time, the emission range 11 of the sonar 8 on the vehicle 4 is known, and the position and orientation (inclination) of the vehicle 4 at the time of obtaining the distance data is obtained based on the steering angle, GPS data, and the like. Accordingly, the reflection wave data for each time the vehicle 4 travels the predetermined distance can be used to create the aforementioned two-dimensional map.

The detection status of the object 7 is determined based on the two-dimensional map, and at that time, the object 7 is linearly approximated using several pre-set points. FIG. 6 shows a state in which the vehicle 4 has reached a position P1. In this state, Z-instances-worth of reflection wave data that was stored each time the vehicle 4 moved forward a predetermined distance is stored in the storage unit 9b. Data regarding the position of the object 7 is calculated based on these pieces of reflection wave data and is plotted on the two-dimensional map as shown in FIG. 6. Incidentally, FIG. 7 shows an example of a two-dimensional map created by processing the Z-instances-worth of reflection wave data stored before the vehicle 4 reached the position P2.

Note that Z-instances-worth of data is not necessarily stored in the storage unit 9b. This is because the reflection waves are not obtained and the reflection wave data cannot be stored at the predetermined data storage timing in some cases, depending on the state of the object 7.

After Z-instances-worth of points are obtained, the object 7 is linearly approximated based on the points. With the present embodiment, the sonar 8 detects the curbstone 7a and the wall 7b, which both exist in a linear shape along the target parking region. Accordingly, the object is linearly approximated using the aforementioned Z-instances-worth of position data regarding the object.

The linear approximation can be performed with the Z-instances-worth of points from the present to the past, for example, using various arithmetic methods, such as a Hough transformation, RANSAC, or a mean square. Also, among the obtained points, in a set of points that can be determined as indicating the same object, the first and last points may be simply linked with a straight line. The straight line obtained thereby using the n-th instance of calculation for example can be expressed with a linear equation such as $Y=an\cdot X+bn$ on the two-dimensional map.

This type of linear approximation and equation is calculated again each time new reflection wave data is stored. In other words, when new reflection wave data is stored in the storage unit 9b with respect to the Z-instances-worth of data that has already been stored, the oldest reflection wave data is deleted as the new data is stored.

In FIG. 6, $Y=a1\cdot X+b1$ is obtained as the linear equation. In FIG. 7, $Y=a2\cdot X+b2$ is obtained as the linear equation. If these points are based on reflection wave data from the same object 7, $a1 \approx a2$ and $b1 \approx b2$. Note that by setting the allowable deviation (threshold) in advance for the coefficient a and the coefficient b, it is possible to determine whether or not the linear approximation obtained for each calculation indicates the same object 7.

It is still unclear whether the thus-specified linear object 7 is the curbstone 7a or the wall 7b. In view of this, linearization is performed, while the detection frequency of the Z-instances-worth of reflection wave data used in the linearization is calculated. As described above, the reflection waves are returned relatively stably from the wall 7b, but in the case of the curbstone 7a, which has a low height, the reflection waves are less likely to be received due to the distance from the vehicle 4. In view of this, by obtaining the detection frequency of the reflection waves as indicated below, it can be specified whether or not the detected object 7 is the curbstone 7a or the wall 7b.

For example, it is expected that a maximum of Z points are obtained by the time the vehicle 4 reaches P1 as shown in FIG. 6. However, due to the distance relationship between the vehicle 4 and the object 7, the reflection wave data is not successfully obtained in some cases. For this reason, the number of points on the two-dimensional map, that is Zn, is normally less than Z. In the present embodiment, each time a new reflection wave data storage timing is reached, for example, the number of points indicated on the two-dimensional map, that is, Zn, is checked, divided by Z, which is the maximum total number, and the detection frequency Kn is obtained.

Detection Frequency $Kn$ (%)=$(Zn/Z) \times 100$

Also, letting Ln be the length of the line in the case where a set of Zn-instances-worth of points indicating the same object are linearly approximated, detection frequency Kn (%)=$(Zn/Ln) \times 100$ may be used.

The detection frequency Kn can be interpreted as expressing the density of the position data relating to the object plotted on the two-dimensional map. The object determination unit 9 determines whether the object 7 is the curbstone 7a or the wall 7b based on trends of increasing and decreasing in the detection frequency Kn.

Figure 8:
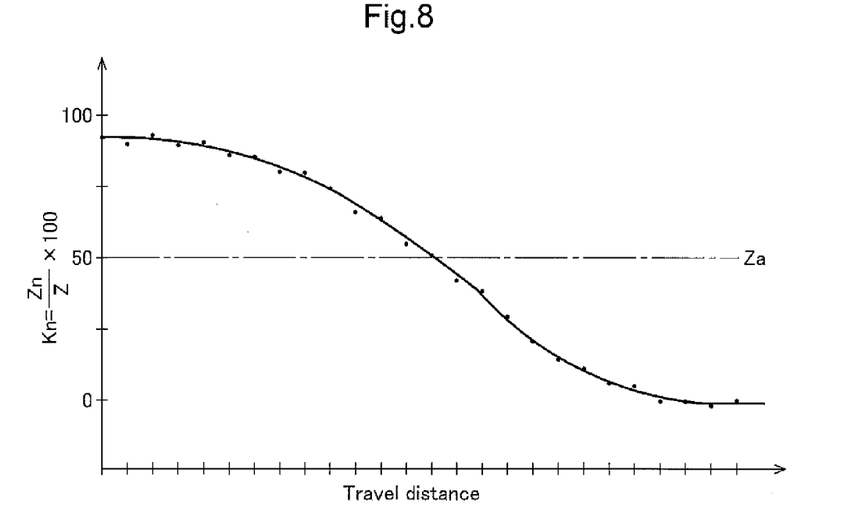
FIG. 8 is a diagram showing a reflection wave detection frequency for an approximated line obtained from a two-dimensional map.

For this purpose, as shown in FIG. 8, attention is given to the relationship between the timing of calculating the position data relating to the object 7 and the obtained detection frequency Kn. In FIG. 8, the traveling distance is shown on the horizontal axis, and the calculated detection frequency Kn is shown on the vertical axis. Since the reflection wave data is stored each time a predetermined distance is traveled by the vehicle 4, and the calculated detection frequency Kn is calculated for each timing, it can be said that the horizontal axis in FIG. 8 simply shows the number of instances of calculation. In the example shown in FIG. 8, the detection frequency Kn indicates a value close to 100% since the reflection wave data is acquired in almost all instances at first. However, subsequently, the reflection wave data can no longer be received when the vehicle 4 approaches the curbstone 7a, for example, and the detection frequency Kn gradually decreases. As shown in FIG. 8, a threshold value Za is set in advance for the detection frequency Kn. Here, it is set to 50%, for example. As shown in FIG. 8, if the detection frequency Kn decreases and is less than the threshold value Za at a certain timing, it can be determined that the decrease in the detection frequency Kn is caused by the vehicle 4 approaching the low-height curbstone 7a, as described above. Accordingly, if a trend such as that shown in FIG. 8 is obtained, it can be determined that the object 7 is the curbstone 7a.

Hereinafter, an embodiment of parking assistance control using this type of determination method will be described.

Parking assistance control is started using an assistance start operation performed by the driver. As shown in FIG. 2 for example, if the vehicle 4 travels forward on the vehicle route 1 and the driver finds an empty region that can be parked in on the forward side in the traveling direction, the driver switches the assistance start operation unit (not shown) on a touch display (not shown) near the driver's seat to ON, thereby starting the parking assistance control (FIG. 10, step #1).

Figure 10:
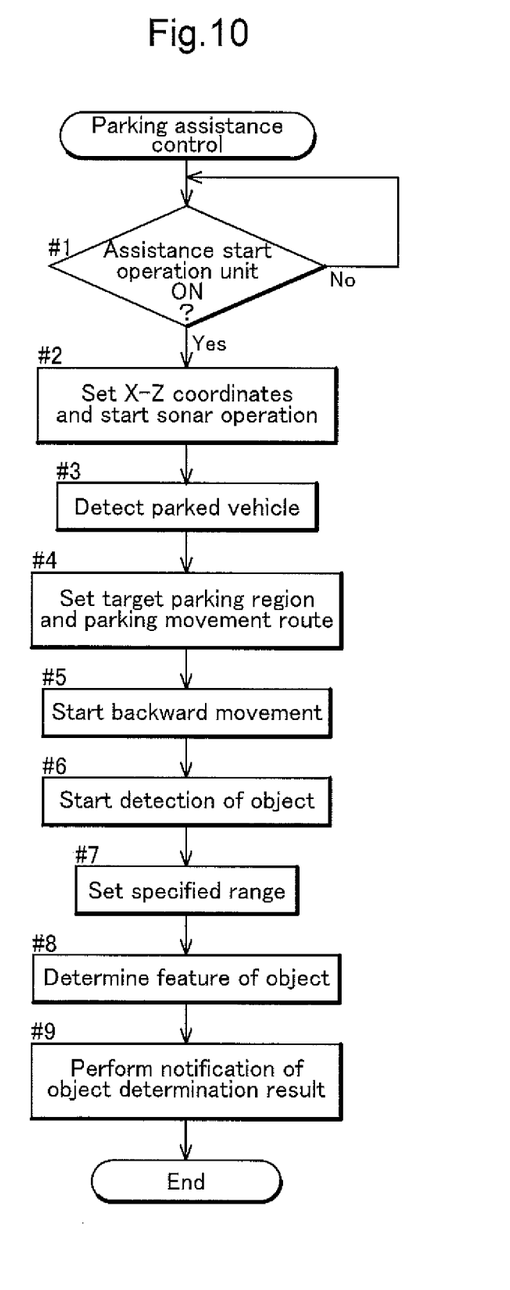
FIG. 10 is a flowchart for parking assistance control.

Upon the assistance start operation unit being switched ON, the sonar 8 starts operating and the X-Z coordinates, which are obtained using the position of the vehicle 4 at that time as the origin, are set, as shown in FIG. 2, for example (FIG. 10, step #2).

Accompanying the forward traveling of the vehicle 4, the sonar 8 detects the positions of the vehicle side surfaces of the parked vehicles 2 that are parked in front of and behind the empty region (step #3). After forward traveling ends, the vehicle 4 detects its own position, and using that position as a reference, sets the target parking region 3 and the parking movement route 6 to the target parking region 3, as shown in FIG. 2 (step #4).

In particular, the target parking region 3 is set using the side surface of the front parked vehicle 2a as a reference. Normally, the alignment direction of the target parking region 3 is set based on the side surface direction of the parked vehicle 2a. Also, if the parked vehicles 2 are present in front of and behind the target parking region 3, the target parking region 3 is set to the central position that is separated from both the front and rear parked vehicles 2 by a predetermined interval.

Upon the target parking region 3 being set, the ECU 5 calculates the parking movement route 6. In the initial period of backward movement, an arcuate initial route 6a is set so as to not come into contact with the parked vehicle 2a. Based on the position obtained by circumventing the parked vehicle 2a, a straight linear route 6b is set toward the far side of the target parking region 3. Furthermore, an arcuate final route 6c is set once again such that the vehicle movement route 6 is aligned with the setting position of the target parking region 3, and as a whole, a continuous, roughly S-shaped route is set.

Subsequently, the driver operates a shift lever (not shown) to the reverse position for example, and thereby reverse movement by means of automatic maneuvering is started (FIG. 10, step #5).

Accompanying the reverse movement of the vehicle 4, detection of the object 7 by means of the sonar 8 is started (FIG. 10, step #6). Each time the vehicle 4 travels in reverse a predetermined distance, the reflection wave data from the object 7 is stored in the storage unit 9b.

Figure 11:
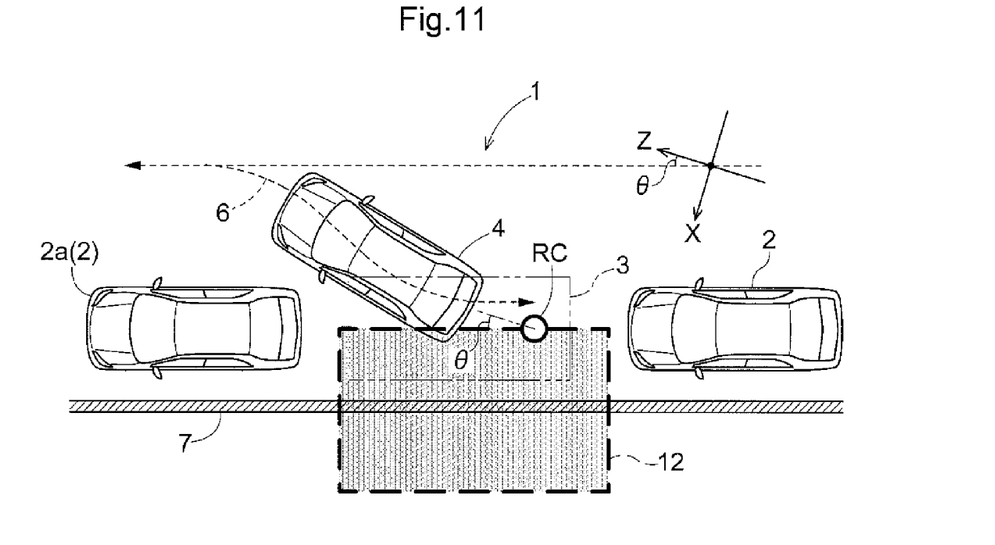
FIG. 11 is a diagram showing a detection range set by a detection range setting unit.

Note that as shown in FIG. 11, when the reflection waves are received, the object determination unit 9 evaluates only the reflection waves from the object 7 that is present in the specified range with respect to the target parking region 3. This is performed by a detection range setting unit 9a included in the object determination unit 9 setting a rectangular specified range 12.

As shown in FIG. 11, the specified range 12 is set to be a rectangular region between the front and rear parked vehicles 2 and is located on the far side from the central position RC of the rear axle of the target parking region 3 indicated by the two-point chain line (FIG. 10, step #7). For example, the specified region 12 is set to be, from the target parking region 3, 5 m to the far side, 1 m to the rear side of the vehicle 4, and 1 m to the front side of the vehicle 4 is set.

Note that the ranges on the front side and rear side of the vehicle 4 may be set as appropriate with consideration given to the positions of the parked vehicles 2 that are present in front of and behind the target parking region 3, such that the ranges do not overlap the parked vehicles 2.

Thus, by setting the determination range only from the central position RC of the rear axle to the far side, it is possible to cut out reflection waves from the parked vehicles 2 when the vehicle 4 first travels forward and sets the target parking region 3.

Accordingly, the position detection for the object 7 located on the far side is accurate, and the reflection waves from the parked vehicles do not interfere with the detection. Furthermore, by restricting the region of detection by means of reflection waves, it is also possible to reduce the calculation load for the position specification of the object 7.

When the sonar 8 detects the object 7, the object determination unit 9 determines whether or not the object 7 is the curbstone 7a or the wall 7b (FIG. 10, steps #7 and 8). As described above, the determination is performed based on the change in the detection frequency Kn of the points shown on the two-dimensional map, while the position data relating to the object calculated based on the reflection wave data is mapped in the two-dimensional map.

Figure 9:
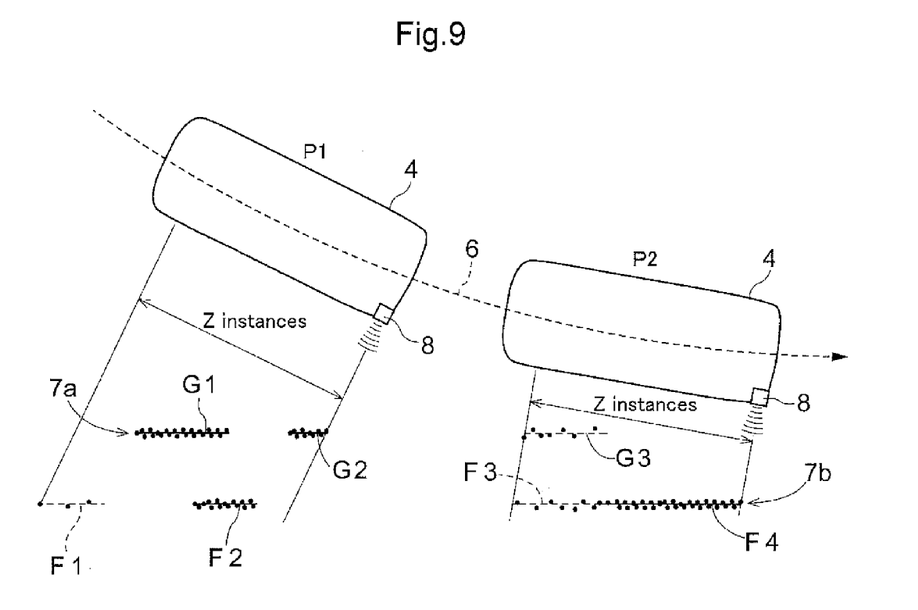
FIG. 9 is a diagram showing an example of a two-dimensional map according to a first embodiment.

FIG. 9 shows an example of the obtained two-dimensional map.

FIG. 9 is an example of object detection performed using a sonar 8 capable of detecting only the closest object 7 at a location at which both a steppingstone-shaped curbstone 7a and a wall 7b are installed (see FIG. 2). By using only the reflection wave data from the closest object, the calculation load for specifying the object 7 can be reduced.

For example, it is assumed that when the vehicle 4 is at the position P1, position data that has been stored Z times before that position was reached has been obtained as shown in FIG. 9.

In this case, two points that exist within a certain distance of each other are a group, and each group is subjected to linear approximation, for example. Note that grouping may be performed using a known technique such as RANSAC. Four straight lines can be specified at the position P1. Among these four lines, lines G1 and G2, which are continuous on the side close to the vehicle 4, are obtained, and lines F1 and F2 are obtained at a position farther than that. As indicated by the solid line, the lines G1 and G2 and the line F2 are lines in which the interval between the points constituting the groups is small. On the other hand, the line F1 is a line in which the interval between the points is large, and is indicated by a broken line. This is due to the fact that the reflection wave data for the nearby objects 7 (lines G1, G2, and F2) has been reliably obtained, while the reflection wave data for the faraway object 7 (line F1) has not been reliably obtained since its distance from the vehicle 4 is originally far.

The drawn line is solid or broken depending on the difference in the detection frequency Kn. Letting Ln be the length of the line obtained for a group of points and Zn be the number of points constituting the group, the detection frequency Kn in this context is represented using the following equation.

$$\text{Detection frequency } Kn = (Zn/Ln) \times 100$$

If all of the obtained points in a group constituting a line are perfectly continuous, Zn/Ln indicates a maximum value. Accordingly, if the threshold value is set to the detection frequency Kn, it is preferable that the threshold value is set by multiplying the maximum value by any coefficient. The solid lines or broken line in FIG. 9 is obtained by using a solid line for values greater than or equal to the threshold value, or using a broken line for those that are less than the threshold value, for example.

In FIG. 9, when the vehicle 4 is at position P1, it is discovered that both nearby and faraway objects exist. However, the height information of these objects is still unclear. The points at the position of P1 are cut off between the two lines G1 and G2, and determination in this cut-off state is problematic. In other words, it is necessary to distinguish between whether the object 7 itself is no longer present or the object 7 could no longer be detected due to its distance relationship with the vehicle 4.

With regard to this point, in the present embodiment, if the alignment of specific points suddenly changes to an alignment of other points that have a different distance from the vehicle 4, it is determined that the object 7 itself is not continuous. In FIG. 9, the alignment of the first points of G1 is suddenly interrupted, and in their place, an alignment of points for F2 appears at a position further from the vehicle 4. In this type of case, it is determined that the objects 7 are aligned in two rows and the object 7 that is closer to the vehicle 4 is not continuous.

Note that the height information of these objects 7 is still unclear with only this information. Accordingly, the creation of the two-dimensional map is continued based on the reflection wave data from the object 7.

Next, attention will be given to the points at the position P2, which is reached when the vehicle 4 travels further in reverse. Points in the line G3 that is near the vehicle 4 and the points in the line F3 that is away from the vehicle 4 are frequently replaced, and in the nearby line G3, they can no longer be detected after entering a state in which the interval between the points is large.

On the other hand, in the faraway line F3, the interval between the points gradually becomes smaller, and thereafter stabilizes and appears as the line F4. Thus, it can be determined that the reason why the points are replaced in a short amount of time and thereafter the nearby object 7 can no longer be detected is because the height of the nearby object 7 is low. Accordingly, based on this kind of detection result, it is understood that the nearby object 7 is the curbstone 7a and the distant object 7 is the wall 7b.

If it is thus determined that the object 7 is the curbstone 7a or the wall 7b, a notification is made to the driver using the result of determination. For example, when the vehicle approaches the determined curbstone 7a or wall 7b such that it is less than or equal to the predetermined distance, the driver is notified to that effect (FIG. 10, step #9). At this time, it is possible to change the method of notification (sound, etc.) for each determined object so that the driver can make a distinction as to whether the object that is being approached is the curbstone 7a or the wall 7b.

Alternatively, a display screen according to which the relative positions of the vehicle and the determined curbstone 7a and wall 7b can be understood may be displayed on the screen of the monitor provided in the passenger area. It is preferable that different display modes are used such that the determined curbstone 7a and wall 7b can be distinguished by the driver on the display screen at this time.

This determination method is an example, and an object that can be detected as a group of close points even when the vehicle is closer than the predetermined distance can be determined as being the wall 7b. Also, it may be determined using a display monitor or the like to monitor changes in the group of points from being close together to being spread-out, or from being spread-out to being close together.

Note that in the above-described embodiment, a case was described in which the emission direction of the ultrasonic waves from the sonar 8 is horizontal. However, an arrangement is also possible in which the ultrasonic waves of the emission unit 8a are emitted in an oblique downward orientation or in an oblique upward orientation. That is to say, if the installation height of the sonar 8 on the vehicle 4 is extremely low or extremely high, a case can occur in which the detection frequency of the curbstone 7a does not change at a suitable timing while the vehicle 4 is in reverse. Accordingly, the emission angle of the sonar 8 may be changed as appropriate.

Second Embodiment

Figure 12:
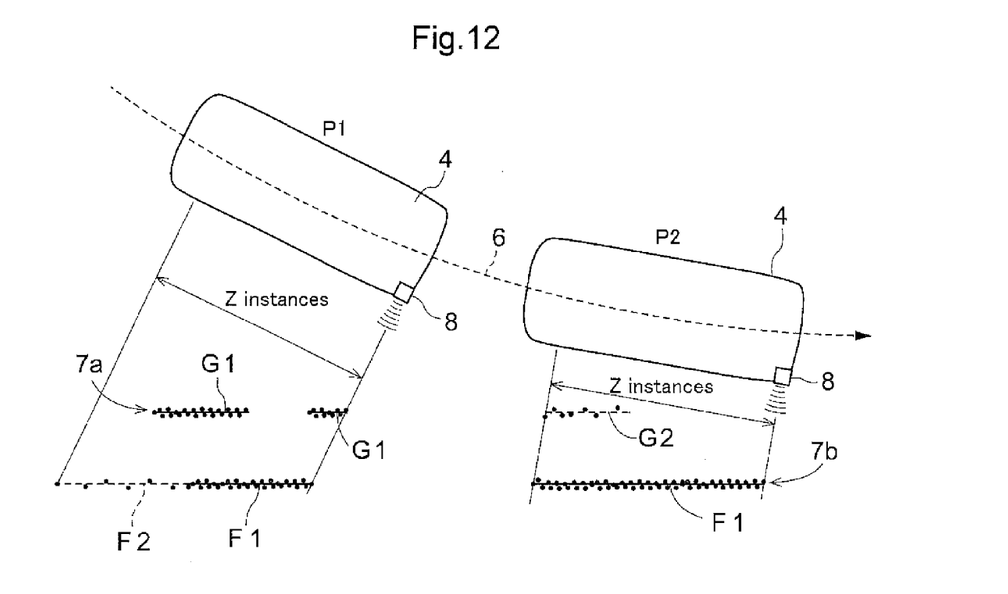
FIG. 12 is a diagram showing an example of a two-dimensional map according to a second embodiment.

FIG. 12 shows an example of a two-dimensional map obtained as a result of detecting the objects 7 using a sonar 8 that is of a type that is different than that of the embodiment above. The sonar 8 used here is not limited to the closest object 7, and can receive reflection wave data from all of the objects 7 that are present within the maximum detection distance LM from the sonar 8.

Accordingly, the shapes of the objects 7 that are present appear clearly, regardless of whether the vehicle 4 is at position P1 or P2. For example, the object 7 near the vehicle 4 is intermittently displayed, and the object 7 that is farther away is continuously displayed. The curbstone 7a is closer and the wall 7b is farther away, and at position P1, since the distance from the sonar 8 to the wall 7b is originally farther away, the detection frequency Kn of the obtained points is low and is displayed as the broken line F2. Note that it is subsequently displayed as the solid line F1 since the detection frequency Kn increases.

On the other hand, after the vehicle 4 further travels in reverse to position P2, the wall 7b still continues to be detected (line F1), but the interval between the points of the curbstone 7a gradually increases and the curbstone 7a subsequently disappears. This state is displayed as the broken line G2.

Thus, in the case of using the sonar 8, which can detect multiple objects along an emission direction, more data processing is needed than in the case of the previous embodiment, even if the same Z-instances-worth of reflection wave data is acquired. However, in the case of creating a two-dimensional map, the shapes of the objects 7 on the road are easier to understand.

That is to say, with the present invention, any type of sonar 8 can be suitably used.

INDUSTRIAL APPLICATION

The parking assistance device according to the present invention can be used for parking assistance for various types of vehicles.

DESCRIPTION OF REFERENCE MARKS/NUMERALS

3: Target parking region
4: Vehicle
7: Object
7a: Curbstone
7b: Wall
8a: Emission unit
8b: Reception unit
9: Object determination unit
9a: Detection range setting unit
12: Specified range

The invention claimed is:

1. A parking assistance device comprising:
an emission unit configured to emit ultrasonic waves in at least an outward lateral direction of a vehicle;
a reception unit configured to receive reflection waves from an object reflecting the emitted ultrasonic waves; and
an object determination unit configured to, based on a change in a detection state of an object that exists on a far side of a target parking region in which the vehicle is to be parked, the detection state having been specified based on reflection wave data obtained using the reflection waves from the object, determine a feature relating to the height of the object as the vehicle enters the target parking region,
wherein the object determination unit includes a storage unit configured to store the reflection wave data each time the vehicle moves a predetermined distance;
wherein the detection state is a detection frequency at a time when the reflection wave data stored in the storage is mapped in a two-dimensional map and the reflection wave data has been grouped based on a distribution state of the mapped reflection wave data, the detection frequency being calculated based on the grouped reflection wave data; and
the emission unit emits the ultrasonic waves in the interior of a conic surface having an angle with respect to the horizontal.

2. The parking assistance device according to claim 1, wherein
when the shape of the grouped region is an elongated shape along the installation position of the target parking region and a plurality of the grouped regions are aligned along the installation position of the target parking region, the object determination unit determines that an object, in a region, whose detection frequency changes from high to low is a curbstone.

3. The parking assistance device according to claim 1, wherein
when the shape of the grouped region is an elongated shape along the installation position of the target parking region and a plurality of the grouped regions are aligned along the installation position of the target parking region, if the detection frequency of a region does not change, or changes from low to high, the object determination unit determines that the object is a wall.

4. The parking assistance device according to claim 1, wherein
the detection state is a calculation value obtained by subjecting the grouped region to linear approximation along the installation position of the target parking region, and dividing the amount of reflection wave data included in the region by the length of the line obtained by linear approximation.

5. The parking assistance device according to claim 4, wherein
when approximated lines are aligned along the installation position of the target parking region, if the calculation value for an approximated line changes from a high value to a low value, the object determination unit determines that the object is a curbstone.

6. The parking assistance device according to claim 4, wherein
when approximated lines are aligned along the installation position of the target parking region, if the calculation value for an approximated line does not change, or changes from a low value to a high value, the object determination unit determines that the object is a wall.

7. The parking assistance device according to claim 1, wherein
the object determination unit includes a detection range setting unit configured to, when the reflection waves from the object are received, set a specification range with respect to the target parking region and use the reflection waves from the object that exists in the specified range as an evaluation target.

8. The parking assistance device according to claim 1, wherein
the object determination unit performs determination based on, among the reflection waves, the reflection waves from an object that is the closest to the reception unit.

9. A parking assistance device comprising:
an emission unit configured to emit ultrasonic waves in at least an outward lateral direction of a vehicle;
a reception unit configured to receive reflection waves from an object reflecting the emitted ultrasonic waves; and
an object determination unit configured to, based on a change in a detection state of an object that exists on a far side of a target parking region in which the vehicle is to be parked, the detection state having been specified based on reflection wave data obtained using the reflection waves from the object, determine a feature relating to the height of the object as the vehicle enters the target parking region,
wherein the object determination unit includes a storage unit configured to store the reflection wave data each time the vehicle moves a predetermined distance;
wherein the detection state is a detection frequency at a time when the reflection wave data stored in the storage unit is mapped in a two-dimensional map and the reflection wave data has been grouped based on a distribution state of the mapped reflection wave data, the detection frequency being calculated based on the grouped reflection wave data; and
wherein the detection state is a calculation value obtained by subjecting the grouped region to linear approximation along the installation position of the target parking region, and dividing the amount of reflection wave data included in the region by the length of the line obtained by linear approximation.

10. The parking assistance device according to claim 9, wherein
when approximated lines are aligned along the installation position of the target parking region, if the calculation value for an approximated line changes from a high value to a low value, the object determination unit determines that the object is a curbstone.

11. The parking assistance device according to claim 9, wherein
when approximated lines are aligned along the installation position of the target parking region, if the calculation value for an approximated line does not change, or changes from a low value to a high value, the object determination unit determines that the object is a wall.

* * * * *